United States Patent
Madau et al.

[11] Patent Number: 6,122,568
[45] Date of Patent: Sep. 19, 2000

[54] METHOD AND APPARATUS FOR DETERMINING THE DYNAMIC STABILITY OF AN AUTOMOTIVE VEHICLE

[75] Inventors: Dinu Petre Madau; Behrouz Ashrafi, both of Dearborn; Hongtei Eric Tseng, Canton, all of Mich.

[73] Assignee: Ford Global Technologies, Inc., Dearborn, Mich.

[21] Appl. No.: 09/218,284

[22] Filed: Dec. 22, 1998

[51] Int. Cl.[7] ........................................ G06F 7/00
[52] U.S. Cl. .................... 701/1; 701/70; 701/79; 701/82; 180/197; 303/146; 303/147
[58] Field of Search .................. 701/1, 70, 72, 701/74, 79, 82; 303/140, 146, 147; 180/197

[56] References Cited

U.S. PATENT DOCUMENTS

| | | |
|---|---|---|
| 4,679,808 | 7/1987 | Ito . |
| 5,345,385 | 9/1994 | Zomotor . |
| 5,446,657 | 8/1995 | Ikeda . |
| 5,471,388 | 11/1995 | Zomotor . |
| 5,576,956 | 11/1996 | Ashizawa . |
| 5,606,502 | 2/1997 | Adachi . |
| 5,686,662 | 11/1997 | Tracht . |
| 5,694,319 | 12/1997 | Suissa . |
| 5,735,584 | 4/1998 | Eckert . |
| 5,790,970 | 8/1998 | Brachert . |
| 5,899,952 | 5/1999 | Fukada ...................................... 701/74 |
| 5,935,186 | 8/1999 | Yamazaki et al. ........................ 701/78 |
| 5,964,819 | 10/1999 | Naito ....................................... 701/72 |

FOREIGN PATENT DOCUMENTS

| | | |
|---|---|---|
| 0 510 365 A2 | 3/1992 | European Pat. Off. . |
| WO 95/26285 | 10/1995 | WIPO . |

*Primary Examiner*—William A. Cuchlinski, Jr.
*Assistant Examiner*—Yonel Beaulieu

[57] ABSTRACT

A method and apparatus for determining the stability of an automotive vehicle includes a steering wheel sensor generating a steering wheel signal, a yaw rate sensor generating a yaw rate signal and a lateral acceleration sensor for generating a lateral acceleration signal. A controller is coupled to the steering wheel sensor, the yaw rate sensor, and the accelerometer. The controller determines a first steering wheel angle from the yaw rate signal, a second steering wheel angle from the lateral acceleration signal, and a third steering angle from a steering wheel signal. The controller generates a vehicle stability indicator in response to the first steering wheel angle, the second steering wheel angle and the third steering wheel angle.

11 Claims, 3 Drawing Sheets

METHOD AND APPARATUS FOR DETERMINING THE DYNAMIC STABILITY OF AN AUTOMOTIVE VEHICLE

TECHNICAL FIELD

The present invention relates to a method and apparatus of determining the dynamic stability of an automotive vehicle.

BACKGROUND

Automakers continue to improve the ride and handling characteristics of the automobile. In some systems, the components of the vehicle were fixed in geometry and characteristics once they were built. The proliferation of less expensive electronics and consumer demand has driven the incorporation of electromechanical dynamic control devices to improve handling and ride characteristics during the operation of the vehicle as conditions change.

Various vehicle dynamic devices such as adjustable suspension units, hydraulic crossover suspension systems, variable volume air suspension springs, or variable stabilizer bars have been contemplated for use in automotive vehicles. Similarly, semi-active and active suspension devices may also be used to improve the ride characteristics of the vehicle. Many of these systems use electronics including sensors, control electronics and various actuators that control vehicle dynamic characteristics.

As an example of a vehicle dynamics device, an interactive vehicle dynamics (IVD) system, may use the brakes independently to assist the driver's ability to turn the motor vehicle. With this system, it is important to first determine whether the vehicle is dynamically stable. Because the various dynamic systems make adjustments to the vehicle characteristics, most systems require an accurate reference at a dynamically stable period of operation. If an accurate determination is not made, the adjustments may not be optimized.

Some systems such as anti-lock brake systems use wheel speeds for determining vehicle stability. While this approach may be suitable for some vehicle dynamic systems, other vehicle dynamic systems require further inputs for a more accurate determination.

It would therefore be desirable to accurately determine whether the vehicle is being operated in dynamically stable position.

SUMMARY OF THE INVENTION

It is therefore an object of the present invention to provide an improved method for determining vehicle stability.

In one aspect of the invention, a method for determining vehicle stability comprises the steps of: determining a first steering wheel angle from a yaw rate; determining a second steering wheel angle from a lateral acceleration; determining a third steering angle from a steering wheel sensor; and generating a vehicle stability indicator in response to the first steering wheel angle, the second steering wheel angle and the third steering wheel angle.

In a further aspect of the invention, an apparatus for determining vehicle stability includes a steering wheel sensor generating a steering wheel signal, a yaw rate sensor generating a yaw rate signal and a lateral acceleration sensor for generating a lateral acceleration signal. A controller is coupled to the steering wheel sensor, the yaw rate sensor, and the accelerometer. The controller determines a first steering wheel angle from said yaw rate signal, a second steering wheel angle from the lateral acceleration signal, and a third steering angle from a steering wheel signal. The controller generates a vehicle stability indicator in response to the first steering wheel angle, the second steering wheel angle and the third steering wheel angle.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
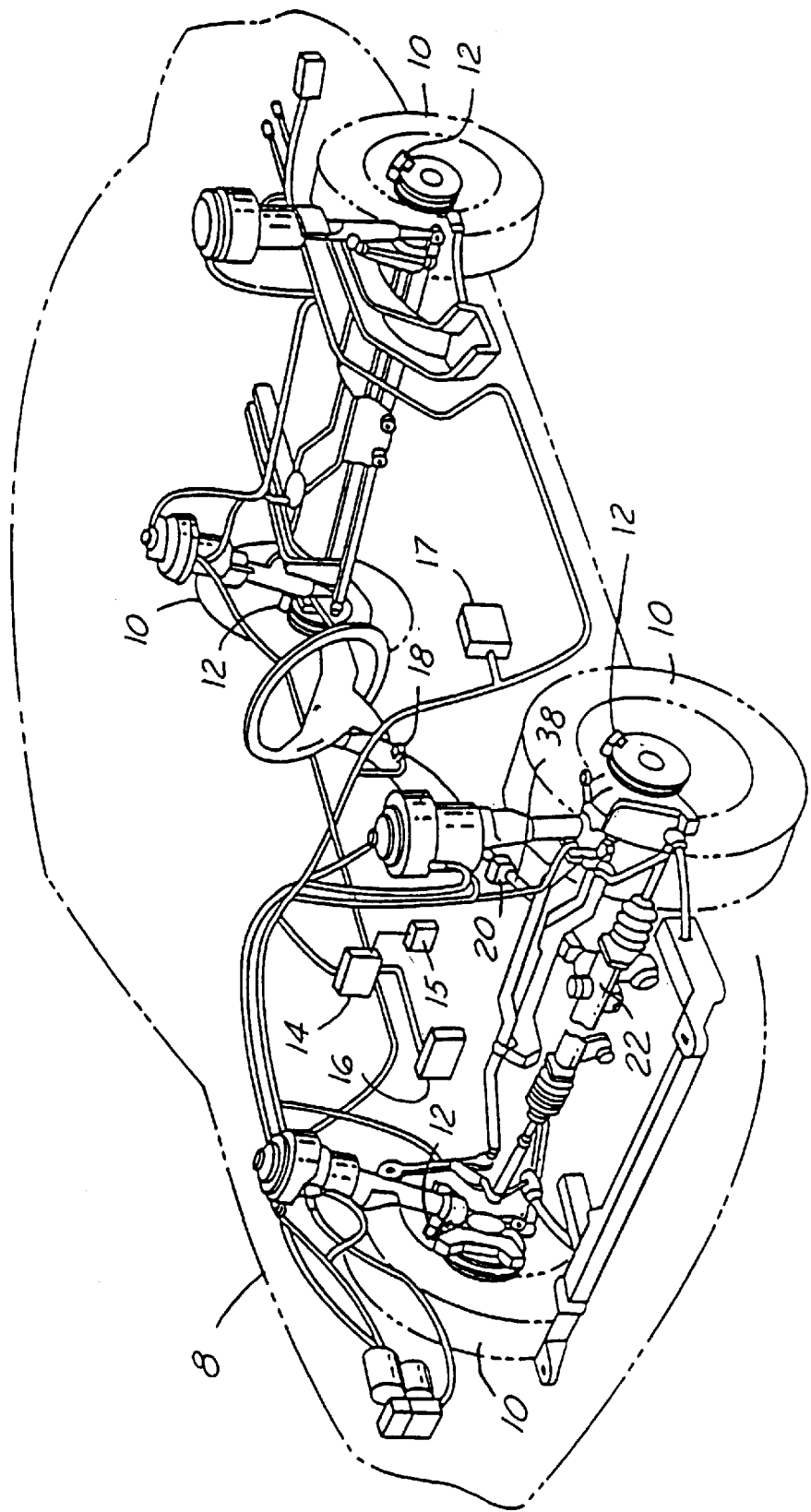
FIG. 1 is a perspective view of a motor vehicle showing various components of a system embodying the present invention.

As shown in FIG. 1, a method according to the present invention may be used with electronically controlled hydraulic braking systems and also steering gears typically found in automotive vehicles. Motor vehicle 8 shown in FIG. 1 is equipped with electronically controlled hydraulic braking systems having controlled brake actuators 12 which cooperate with wheel and tire assemblies 10. These brake actuators may be constructed in a known manner such as that commonly employed on Ford Motor vehicles in use today. Those skilled in the art will appreciate in view of this disclosure that a method according to the present invention could be utilized in the control of other adjustable vehicular devices such as steering systems, adjustable suspension units, hydraulic crossover suspension systems, variable volume air suspension springs, or variable stabilizer bars. Similarly, a system according to the present invention could be employed with semi-active and active suspension devices.

Figure 2:
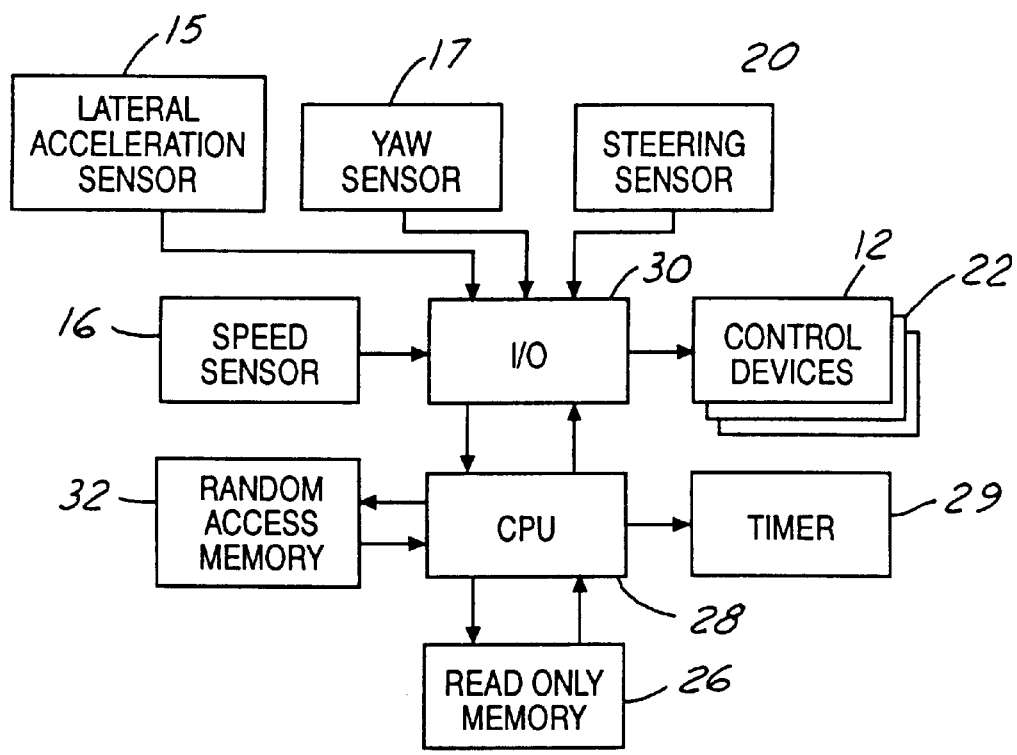
FIG. 2 is an overall system block diagram in accordance with an embodiment of the present invention.

The component parts of a system that may be used with the present invention are shown in FIGS. 1 and 2. Control module 14 receives input from a lateral acceleration sensor 15, a speed sensor 16, a yaw rate sensor 17, a brake sensor 18 and steering sensor 20. Although not illustrated, height sensors and other accelerometers could be employed with the various dynamic control systems utilizing the present invention. A system according to the present invention could, as previously noted, be used with braking systems or other automotive equipment with which it is necessary to know whether the vehicle is dynamically stable.

Those skilled in the art will appreciate in view of this disclosure that lateral acceleration sensor 15 may be, for example, implemented in an accelerometer mounted at the center of gravity of the vehicle. Of course, other suitable locations may be used since the yaw rate may be used to derive the lateral acceleration as if it was determined at the center of gravity of the vehicle. As will be further discussed below, the output signal of lateral acceleration sensor 15 with control module 14 may be used as a redundant way to determine Steering Wheel Angle (SWA).

Speed sensor 16 may comprise any of a variety of devices or systems commonly employed in automotive vehicles. One type of automotive speed sensor 16 suitable for use with a system according to the present invention comprises a speed module for receiving input from multiple speed sensors adapted to indicate the speed of the individual wheels. The speed module derives a longitudinal vehicle speed signal by combining the signals from the speed sensors. One such type of speed signal module is embodied in brake control modules presently used in Ford Motor Company vehicles. The individual wheel speeds are ascertained using pulse generators disposed at each wheel.

Various types of yaw sensors 17 may also be employed. Suitable yaw sensors may include piezoelectric and silicon micro-machined devices. As will be further discussed below, the output signal of yaw sensor 17 with control module 14 is used as a redundant way to determine Steering Wheel Angle (SWA).

A control module 14 (FIG. 1) may output commands to brake actuators 12 (control devices 12, FIG. 2), or provide an indication of vehicle stability to other control devices. Those skilled in the art will appreciate that the processor within the control module and its associated peripheral equipment could be structured according to several different architectures. In a preferred embodiment, the processor is configured so that a control program is sequentially read for each unit command from a read-only memory (ROM) 26 which stores preset control programs. Unit commands are executed by a central processing unit (CPU) 28. The processor integrally includes a timer 29, an input-output control circuit (I/O) 30 for exchanging data with external devices and a random access memory (RAM) 32 for temporarily holding data while the data are being processed. CPU 28 may be used to generated an indicator indicated whether the vehicle is dynamically stable.

Steering sensor 20, acting in conjunction with control module 14, includes means for measuring the excursion angle of the steering mechanism as a series of marker counts or steps measured from the initial position which the steering mechanism occupied when the system was activated by an operator keying on the ignition of the vehicle. Also, a means may be provided for estimating the center position of the steering wheel.

Figure 3:
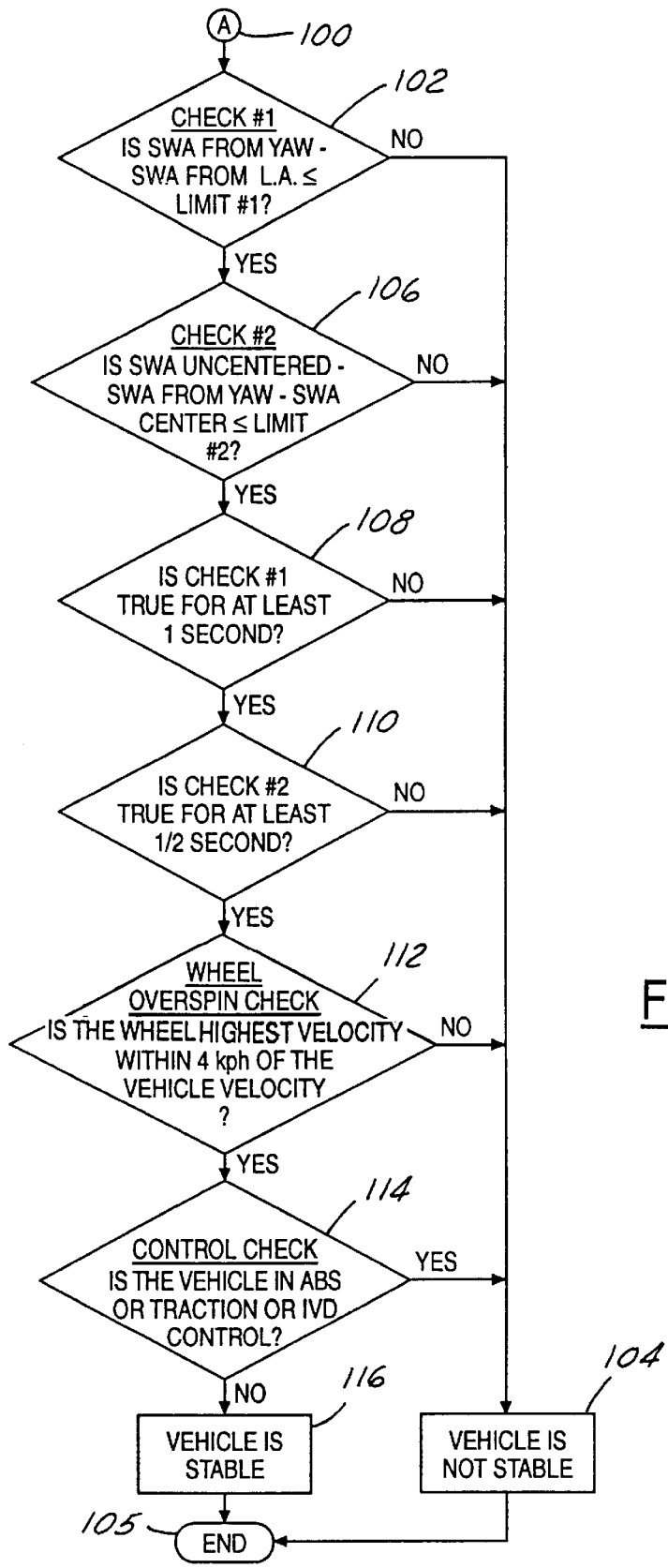
FIG. 3 is a flowchart of a method for determining vehicle stability in accordance with the present invention.

Referring now to FIG. 3, the operation of a system in accordance with the present invention will be further explained. At step 100, the processor starts the illustrated algorithm when the operator keys on the vehicle ignition, or at anytime during operation of the vehicle when a determination of vehicle stability is needed. Step 102 is then executed. In step 102, CPU 28 receives electrical signals from yaw sensor 17 and lateral acceleration sensor 15. CPU 28 converts the electrical signal to numeric indications of yaw rate and lateral acceleration, respectively. A first steering wheel angle may then be calculated from the yaw rate (YR) according to the following formula when solved for steering wheel angle SWA:

$$\delta_f = \frac{r}{u}\left(L + \frac{K_{us}}{g}U^2\right)$$

$$SWA_1 = \delta_f * K_{sr} 57.295$$

where $\delta_f$ is an average of the front tire steering angles, L is the vehicle's wheel base, g is gravity, r is vehicle's yaw rate, u is the vehicle's longitudinal velocity, $K_{us}$ is the vehicle's understeer coefficient; $K_{sr}$ is the steering ratio, and 57.295 is the conversion factor from radians to degrees.

A second steering wheel angle is then calculated from the lateral acceleration (LATACCEL) according to the following formula when solved for SWA:

$$\delta_f = \frac{A_y}{u_2}\left(L + \frac{K_{us}}{g}U^2\right)$$

$$SWA_2 = \delta_f * K_{sr} 57.295$$

where $A_y$ is the vehicle's lateral acceleration, and L is the vehicle's wheel base. The other variables are the same variables defined above with respect to yaw rate.

CPU 28 calculates a first difference between the first steering wheel angle and the second steering wheel angle. The first difference is then compared with a first predetermined limit. One indication that the vehicle is dynamically stable is by having the first steering wheel angle and the second steering angle be exactly equal. However, in an actual implementation, if the first steering angle and the second steering angle are close, i.e., within a first predetermined limit, the vehicle is likely to be dynamically stable. In an actual implementation, the limit may be experimentally determined. A suitable first limit, for example, has the first and second steering angles within 35 degrees of each other. If the first difference is not less than or equal to the first predetermined limit then step 104 is executed which provides an indication that the vehicle is not dynamically stable. Step 105 is then executed which ends the routine.

If in step 102 the difference of the first and second steering wheel angle is equal to or less than the first limit, then step 106 is executed. Step 106 provides a second check in determining stability. In step 106, the third steering wheel angle is determined from steering sensor 20. Some steering sensors are coded so that an absolute position may be obtained. Another type of steering sensor may use a relative sensor that gives the relative position to some point.

The steering wheel sensor is used to provide a measured SWA for an uncentered position. CPU 28 reads the uncentered SWA and a center steering wheel angle is estimated by CPU. A relative steering wheel angle with respect to center may then be calculated by subtracting the measured SWA and center SWA.

Another indication of vehicle stability exists when the steering wheel angle calculated from the yaw rate sensor described above and the relative steering wheel angle are equal. However, for the reasons described above, if the calculations are within a second predetermined limit, then the results are adequate. A suitable limit may be 20 degrees. In step 106, if the difference between the relative steering wheel angle and the first steering wheel angle derived from the yaw rate sensor are not equal or not less than the second limit, then step 104 is executed and an indication of the vehicle not being stable is generated. Step 105 is then executed.

If the vehicle is within or equal to the predetermined limit in step 106, then the vehicle is stable and an appropriate indicator may be generated.

In an actual implementation, however, it may be statistically useful to verify that the results of steps 102 and 106 have been maintained for predetermined time periods. There may be times during vehicle operation when steps 102 and 106 are true for an instant and thus do not provide an accurate measurement of vehicle stability.

In step 108, the truth of step 102 must be maintained for a first predetermined time period for the vehicle to be considered stable. In step 108, the first predetermined time period is set for one second. However, various other time periods may be suitable depending on the vehicle on which such a system is implemented. In a constructed embodiment, a one-second countdown timer was started if step 102 was true. If step 102 is not true for one second, then the vehicle is not stable and steps 104 and 105 are executed. If step 102 is true for one second, this indicates the vehicle may be stable. Step 110 is then executed.

In step 110, the truth of step 106 must be maintained for a second predetermined time period for the vehicle to be considered stable. In step 110, the second predetermined time period is set for one-half second. However, various other time periods may be suitable depending on the vehicle on which such a system is implemented. If step 106 is not true for one-half second, as measured by timer 29, then the vehicle is not stable and steps 104 and 105 are executed.

Another check for vehicle instablitiy is to determine whether one wheel is spinning at a rate greater than the vehicle velocity. In step 112, timer 29 checks the velocity of each wheel versus the overall vehicle velocity. In step 112, signals from speed sensor 16 may be used to obtain the velocity of each wheel and the wheel with the highest velocity. One skilled in the art would also recognize that the overall vehicle velocity may be derived from the vehicle velocity from each wheel speed sensor in a known manner. In step 112, if the highest wheel velocity from each of the wheels is not within a predetermined velocity from the vehicle velocity, then this is an indication that the vehicle is not stable. Following through with the present example, four kilometers per hour was chosen as the predetermined velocity. Thus, if the maximum wheel speed is not within four kilometers per hour, then steps 104 and 105 are executed. If no wheel is greater than four kilometers per hour, then step 114 is executed.

In step 114, if the vehicle is being controlled by another control device such as anti-lock brakes, traction control, interactive vehicle dynamics (IVD) system, or another vehicle dynamic system, then the vehicle is not stable. Steps 104 and 105 are then executed. If the vehicle is not under control of a control device, then step 116 is executed.

In step 116, an indicator is generated to indicate that the vehicle is stable. The indicator as mentioned above may be a software flag, a control signal, a visual signal, or an audible indicator.

While particular embodiments of the invention have been shown and described, numerous variations and alternate embodiments will occur to those skilled in the art. Accordingly, it is intended that the invention be limited only in terms of the appended claims.

What is claimed is:

1. A method for determining the dynamic stability of an automotive vehicle comprising the steps of:
    measuring a yaw rate from a yaw rate sensor;
    determining a first steering wheel angle from the yaw rate;
    measuring a lateral acceleration from lateral acceleration sensor;
    determining a second steering wheel angle from the lateral acceleration;
    calculating a first difference between the first steering wheel angle and the second steering wheel angle;
    determining if the first difference is less than a first predetermined limit;
    determining a third steering angle from a steering wheel sensor;
    calculating a second difference between the first steering wheel angle and the third steering wheel angle; and
    generating a vehicle stability indicator if the first difference is less than a first predetermined limit and if the second difference is less than a second predetermined limit.

2. A method as recited in claim 1 wherein the step of determining a third steering wheel angle from a steering wheel sensor comprises the step of calculating a relative steering wheel angle by calculating a third difference between a measured steering wheel angle and an estimated center steering wheel position.

3. A method as recited in claim 1 further comprising the step of determining the vehicle velocity and determining a highest wheel velocity from each vehicle wheel.

4. A method as recited in claim 1 wherein said step of generating a vehicle stability indicator comprises generating an indicator if the highest wheel vehicle velocity is not within a predetermined velocity from the vehicle velocity.

5. A method as recited in claim 1 wherein the step of generating a vehicle stability indicator further comprises the step of setting a software flag.

6. A method as recited in claim 1 wherein the step of determining a third steering angle comprises the steps of measuring a third steering wheel angle from a steering wheel sensor.

7. A method as recited in claim 1 wherein determining a first steering wheel angle from the yaw comprises the step of evaluating the following relationship:

$$\delta_f = \frac{r}{u}\left(L + \frac{K_{us}}{g}U^2\right)$$

$$SWA_1 = \delta_f * K_{st} 57.295$$

where $\delta_f$ is an average of the front tire steering angles, L is a vehicle's wheel base, g is gravity, r is a vehicle's yaw rate, u is a vehicle's longitudinal velocity, $K_{us}$ is a vehicle's understeer coefficient; $K_{st}$ is the steering ratio, and 57.295 is a conversion factor from radians to degrees.

8. A method as recited in claim 1 wherein the step of determining a second steering wheel angle from the lateral acceleration comprises the step of evaluating the following relationship:

$$\delta_f = \frac{A_y}{u_2}\left(L + \frac{K_{us}}{g}U^2\right)$$

$$SWA_2 = \delta_f * K_{st} 57.295$$

where $A_y$ is the vehicle's lateral acceleration, $\delta_f$ is an average of the front tire steering angles, L is a vehicle's wheel base, g is gravity, u is a vehicle's longitudinal velocity, $K_{us}$ is a vehicle's understeer coefficient; $K_{st}$ is the steering ratio, and 57.295 is a conversion factor from radians to degrees and $SWA_2$ is said second steering wheel angle.

9. A method as recited in claim 1 further comprising the step of determining if the vehicle is under the control of a control device, and wherein the step of generating a vehicle stability indicator comprises the step of generating a vehicle indicator if the vehicle is not under the control of said control device.

10. A method as recited in claim 1 further comprising the step of repeating the step of determining a first steering wheel for a first predetermined time.

11. A method as recited in claim 1 further comprising the step of repeating the step of determining a second steering wheel angle for a second predetermined time.

* * * * *